United States Patent
Brown et al.

(10) Patent No.: US 9,906,245 B2
(45) Date of Patent: Feb. 27, 2018

(54) POINT-TO-POINT COMMUNICATIONS LINK

(71) Applicant: RAYTHEON COMPANY, Waltham, MA (US)

(72) Inventors: Kenneth W. Brown, Yucaipa, CA (US); Michael J. Sotelo, Chino, CA (US); April R. Sanders, Corona, CA (US)

(73) Assignee: RAYTHEON COMPANY, Waltham, MA (US)

( * ) Notice: Subject to any disclaimer, the term of this patent is extended or adjusted under 35 U.S.C. 154(b) by 118 days.

(21) Appl. No.: 14/854,415

(22) Filed: Sep. 15, 2015

(65) Prior Publication Data
US 2017/0077965 A1 Mar. 16, 2017

(51) Int. Cl.
| H04B 1/00 | (2006.01) |
| H04B 1/10 | (2006.01) |
| H04B 7/06 | (2006.01) |
| H04B 7/08 | (2006.01) |
| H04B 7/12 | (2006.01) |
| H04L 25/02 | (2006.01) |

(52) U.S. Cl.
CPC ......... *H04B 1/0057* (2013.01); *H04B 7/0671* (2013.01); *H04B 7/0894* (2013.01); *H04B 1/10* (2013.01); *H04B 7/068* (2013.01); *H04B 7/0697* (2013.01); *H04B 7/12* (2013.01); *H04L 25/0262* (2013.01)

(58) Field of Classification Search
CPC ...... H04B 1/0057; H04B 1/10; H04B 7/0671; H04B 7/068; H04B 7/0697; H04B 7/0894; H04B 7/12; H04L 25/0262
See application file for complete search history.

(56) References Cited

U.S. PATENT DOCUMENTS

| 3,763,492 A * | 10/1973 | Easton ................... G01S 11/08 |
| | | 342/458 |
| 4,278,978 A | 7/1981 | Easterling et al. |
| 4,849,998 A * | 7/1989 | Poklemba ............. H04L 7/0334 |
| | | 375/344 |
| 6,317,420 B1 | 11/2001 | Schiff |

(Continued)

OTHER PUBLICATIONS

Invitation to Pay Additional Fees in corresponding International Patent Application No. PCT/US2016/042342, Invitation dated Oct. 13, 2016 (5 pgs.).

(Continued)

*Primary Examiner* — Parth Patel
*Assistant Examiner* — Kai Chang
(74) *Attorney, Agent, or Firm* — Lewis Roca Rothgerber Christie LLP

(57) ABSTRACT

A communications system having two terminals, each including two antennas, the communications system using spatial multiplexing. One antenna of a first terminal transmits a tracking tone along with a data signal. Two antennas in a second terminal receive the tracking tone. The signals from the two antennas are processed by a feed circuit. The feed circuit includes a variable delay circuit and a combiner that forms, at a first difference output, a linear combination, of a signal from the first antenna and a signal from the second antenna, in which the tracking tone is canceled. The variable delay circuit is actively adjusted to maintain this cancellation.

19 Claims, 8 Drawing Sheets

(56) References Cited

U.S. PATENT DOCUMENTS

| | | | |
|---|---|---|---|
| 6,625,129 B1 | 9/2003 | Olds et al. | |
| 7,711,030 B2 | 5/2010 | Perlman | |
| 8,149,742 B1* | 4/2012 | Sorsby | H04B 1/0057 370/219 |
| 8,948,239 B1* | 2/2015 | Martin | H01Q 21/28 375/224 |
| 2005/0117660 A1* | 6/2005 | Vialle | H04B 1/7115 375/299 |
| 2006/0034383 A1* | 2/2006 | Su | H04B 7/0667 375/267 |
| 2010/0093282 A1* | 4/2010 | Martikkala | H04B 17/364 455/63.4 |
| 2010/0267347 A1* | 10/2010 | Melis | H04B 7/0671 455/73 |
| 2011/0230143 A1* | 9/2011 | Lundstrom | H04W 24/06 455/67.11 |
| 2011/0298505 A1* | 12/2011 | Khoury | H03L 7/0818 327/156 |
| 2012/0027141 A1* | 2/2012 | Petrovic | H04B 7/18513 375/350 |
| 2012/0161904 A1* | 6/2012 | Do | H01P 1/183 333/202 |
| 2012/0252392 A1 | 10/2012 | Wilkerson et al. | |
| 2012/0281781 A1* | 11/2012 | Xiao | H04B 7/024 375/267 |
| 2013/0183896 A1 | 7/2013 | Gore et al. | |
| 2013/0293308 A1* | 11/2013 | Gupta | H03F 1/3229 330/293 |
| 2013/0336417 A1* | 12/2013 | Takei | H04B 7/10 375/267 |
| 2014/0327579 A1* | 11/2014 | Hart | H04W 64/006 342/374 |
| 2015/0087246 A1* | 3/2015 | Khlat | H04L 5/14 455/77 |
| 2015/0162971 A1* | 6/2015 | Kobayashi | H01Q 3/24 455/62 |
| 2015/0244431 A1 | 8/2015 | Vosburgh | |
| 2016/0013820 A1* | 1/2016 | Yamanouchi | H04B 1/0475 375/297 |
| 2017/0063404 A1* | 3/2017 | Langer | H04W 72/0453 |

OTHER PUBLICATIONS

International Search Report from related International Application No. PCT/US2016/042342, International Search Report dated Sep. 30, 2016 and dated Dec. 6, 2016 (6 pgs.).

Written Opinion of the International Searching Authority from related International Application No. PCT/US2016/042342, dated Dec. 6, 2016 (9 pgs.).

* cited by examiner

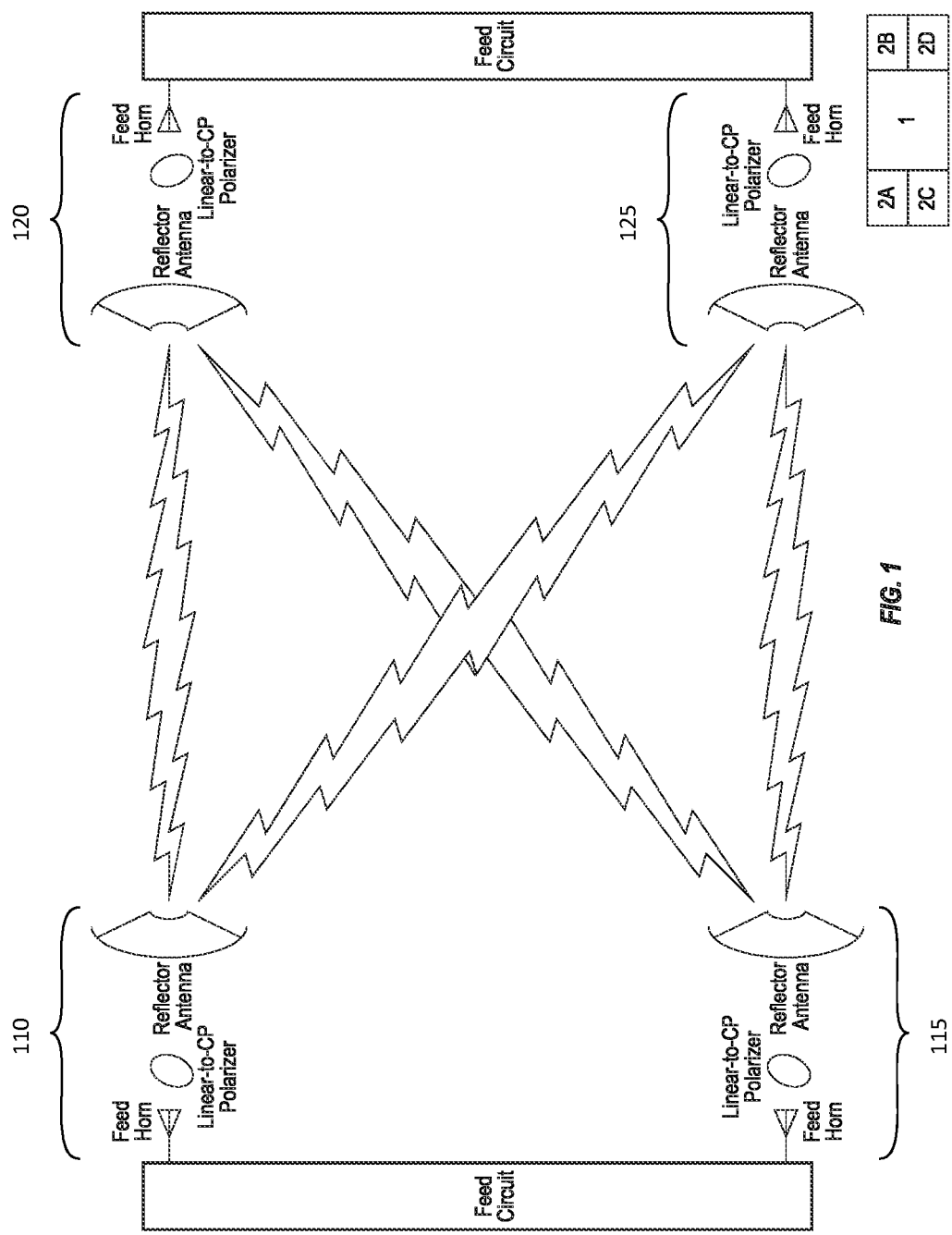

POINT-TO-POINT COMMUNICATIONS LINK

BACKGROUND

1. Field

One or more aspects of embodiments according to the present invention relate to point-to-point radio and microwave communications, and more particularly to a system for multiplexing multiple data streams within a single communications link.

2. Description of Related Art

Communications links are used extensively in military and commercial applications, to transmit various kinds of data. Fiber optic systems have high data rate capacity but require expensive infrastructure to implement. Point-to-point radio frequency (RF) communications systems require little infrastructure but may be limited in data rate capacity due to bandwidth limitations. A point-to-point radio frequency (RF) communications system capable of high data rates may have important commercial applications including providing dedicated data links between multiple facilities of an organization, when the facilities are within line of sight of each other. Thus, there is a need for a system for transmitting high rate data across a point-to-point RF link.

SUMMARY

According to an embodiment of the present invention there is provided a communications system, including: a first antenna configured to transmit a first tracking tone; a second antenna; a third antenna; a fourth antenna; and a feed circuit connected to the third antenna and the fourth antenna, the feed circuit including a first variable delay circuit, a first combiner having a first difference output, and a first math block, the first combiner being operatively coupled to the third antenna and to the fourth antenna, the first combiner being configured to form, at the first difference output, a first linear combination of a signal from the third antenna and a signal from the fourth antenna, the signal from the fourth antenna being delayed by the first variable delay circuit, the first math block being configured to output, at a first control output, a signal proportional to a first delay error, the first delay error being the difference between: a present setting of the first variable delay circuit. and a nulling setting of the first variable delay circuit, for which, in the first linear combination, a first tracking tone contribution is canceled by a second tracking tone contribution, the first and second tracking tone contributions corresponding to the first tracking tone received by the third and fourth antennas respectively, the first control output being operatively coupled to the first variable delay circuit.

In one embodiment, the first tracking tone includes a tone at a carrier frequency, amplitude modulated at a first modulation frequency.

In one embodiment, the first combiner further has a first sum output, and the first combiner is configured to form, at the first sum output, a second linear combination of the signal from the third antenna and the signal from the fourth antenna, the signal from the fourth antenna being delayed by the first variable delay circuit.

In one embodiment, the first math block includes: a first band-pass filter connected to the first sum output; a second band-pass filter connected to the first difference output; a 90-degree coupler connected to the first band-pass filter and the second band-pass filter, a first detector and a second detector connected to two respective outputs of the 90-degree coupler; a third band-pass filter connected to the first detector; a fourth band-pass filter connected to the second detector; and a summing circuit connected to respective outputs of the third band-pass filter and the fourth band-pass filter, a summing output of the summing circuit being connected to the first control output.

In one embodiment, the feed circuit further includes a second variable delay circuit, and the signal from the third antenna is delayed by the second variable delay circuit.

In one embodiment, the second antenna is configured to transmit a second tracking tone; the feed circuit further includes a second variable delay circuit and a second combiner having a second difference output operatively coupled to the third antenna and to the fourth antenna, the second combiner being configured to form, at the second difference output, a third linear combination of a signal from the third antenna and a signal from the fourth antenna, the signal from the third antenna being delayed by the second variable delay circuit; and the feed circuit includes a second math block configured to output, at a second control output, a signal proportional to a second delay error, the second delay error being the difference between: a present setting of the second variable delay circuit and a nulling setting of the second variable delay circuit, for which, in the third linear combination, a third tracking tone contribution is canceled by a fourth tracking tone contribution, the third and fourth tracking tone contributions corresponding to the second tracking tone received by the third and fourth antennas respectively, the second control output being operatively coupled to the second variable delay circuit.

In one embodiment, the second tracking tone includes a tone at the carrier frequency, amplitude modulated at a second modulation frequency.

In one embodiment, the feed circuit further includes a diplexer, having a first frequency-selective port, a second frequency-selective port, and a common port, the diplexer being connected between the third antenna and the first combiner, the diplexer being configured to transmit signals in a first frequency range to the first combiner.

In one embodiment, the first frequency range extends from about 71 GHz to about 76 GHz.

In one embodiment, the feed circuit further includes an orthomode transducer connected between the third antenna and the first combiner, the orthomode transducer being configured to transmit signals having a first linear polarization from the third antenna to the first combiner.

In one embodiment, the third antenna includes a linear-to-circular polarization polarizer.

In one embodiment, the first difference output is connected to a diplexer having a first frequency-selective port, a second frequency-selective port, and a common port, the first difference output being connected to the common port.

In one embodiment, the first frequency-selective port of the diplexer is connected to an input of a modulator demodulator.

In one embodiment, the modulator demodulator includes a mixer connected to the input of the modulator demodulator and a modem chip.

In one embodiment, the modem chip is an application specific integrated circuit.

In one embodiment, the modem chip is configured to demodulate quadrature amplitude modulation.

According to an embodiment of the present invention there is provided a communications system including: a first terminal; and a second terminal, the first terminal being configured to receive, from the second terminal, electromagnetic waves including: a first component, modulated with a first data stream, and having: a first polarization state, a first carrier frequency, and a first direction, and a second component, modulated with a second data stream, and having: a second polarization state, different from the first polarization state, a second carrier frequency, different from the first carrier frequency, and a second direction, different from the first direction.

According to an embodiment of the present invention there is provided a communications system, including: a first antenna; a second antenna; and a feed circuit connected to the first antenna and to the second antenna, the feed circuit having two outputs and including a variable delay circuit, the feed circuit being configured: to form, at a first output of the two outputs, a signal corresponding to a superposition of a signal received by the feed circuit from the first antenna and a signal received by the feed circuit from the second antenna, delayed by the variable delay circuit, and to adjust a delay of the variable delay circuit so as to cancel, at the first output, a signal corresponding to an electromagnetic wave received from a first direction.

BRIEF DESCRIPTION OF THE DRAWINGS

Features, aspects, and embodiments are described in conjunction with the attached drawings, in which:

FIG. 1 is a system level block diagram of a communications system according to an embodiment of the present invention;

DETAILED DESCRIPTION

Figure 2A:
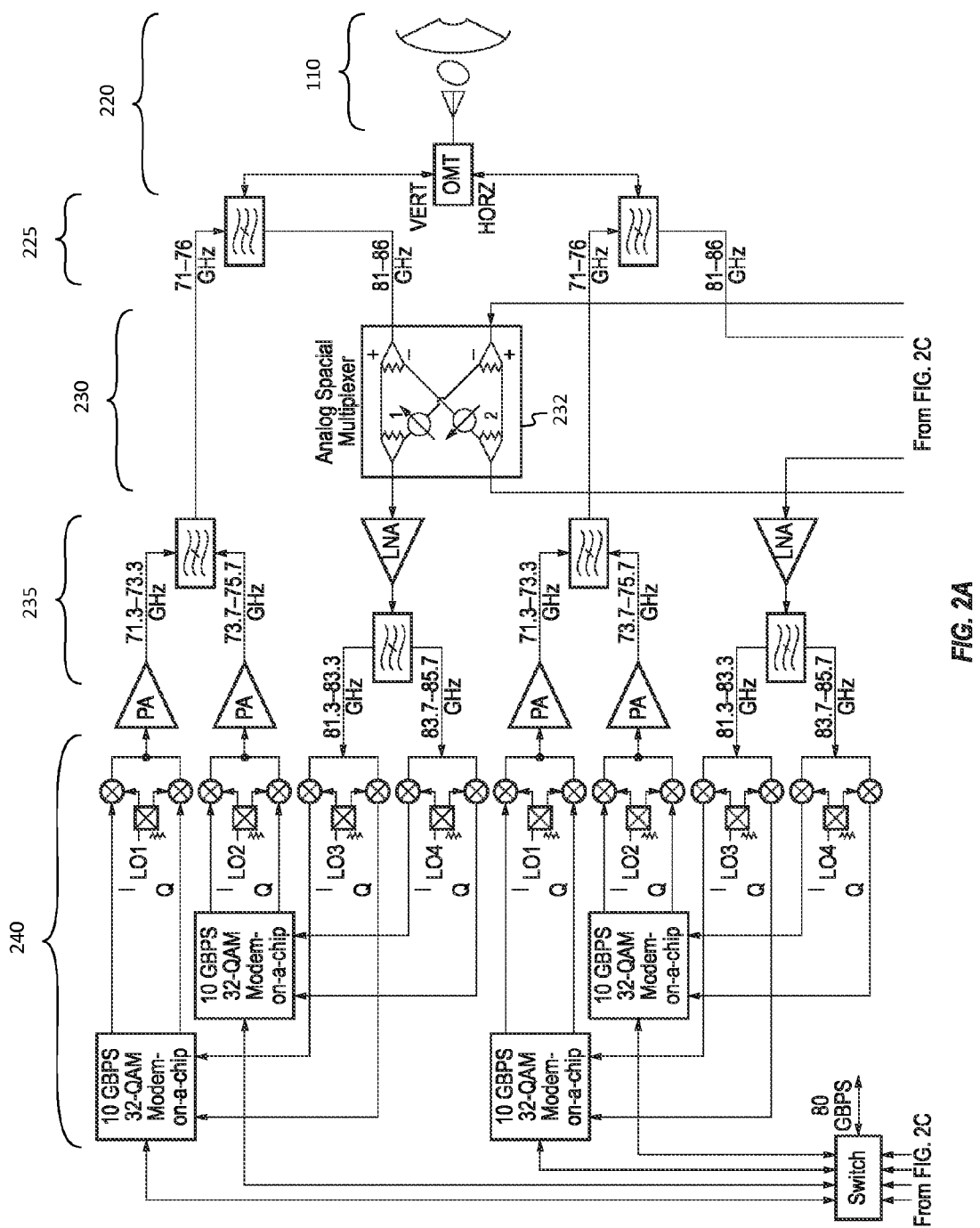
FIG. 2A is an enlarged view of a portion of the system of FIG. 1, according to an embodiment of the present invention.
Figure 2B:
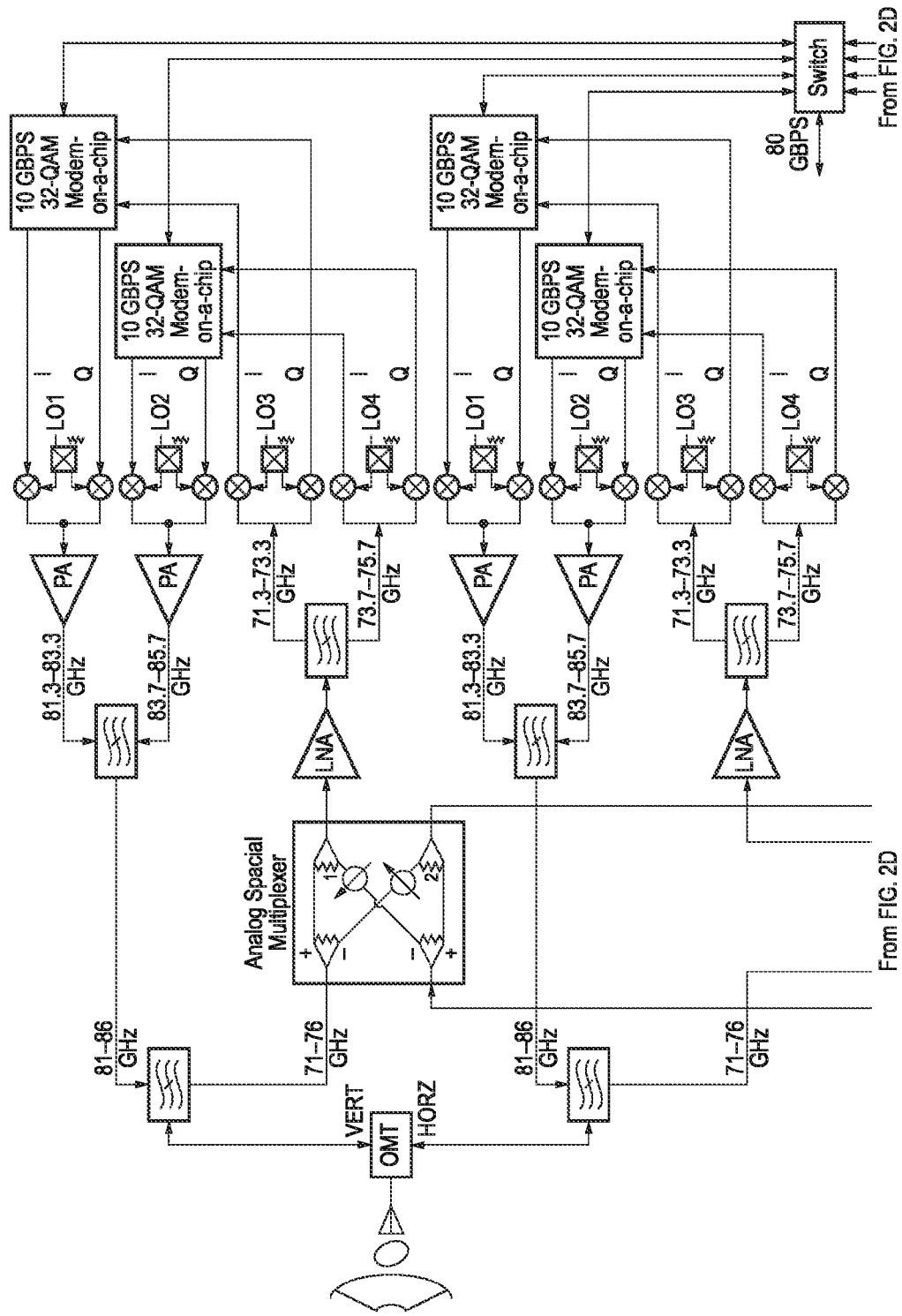
FIG. 2B is an enlarged view of a portion of the system of FIG. 1, according to an embodiment of the present invention.
Figure 2C:
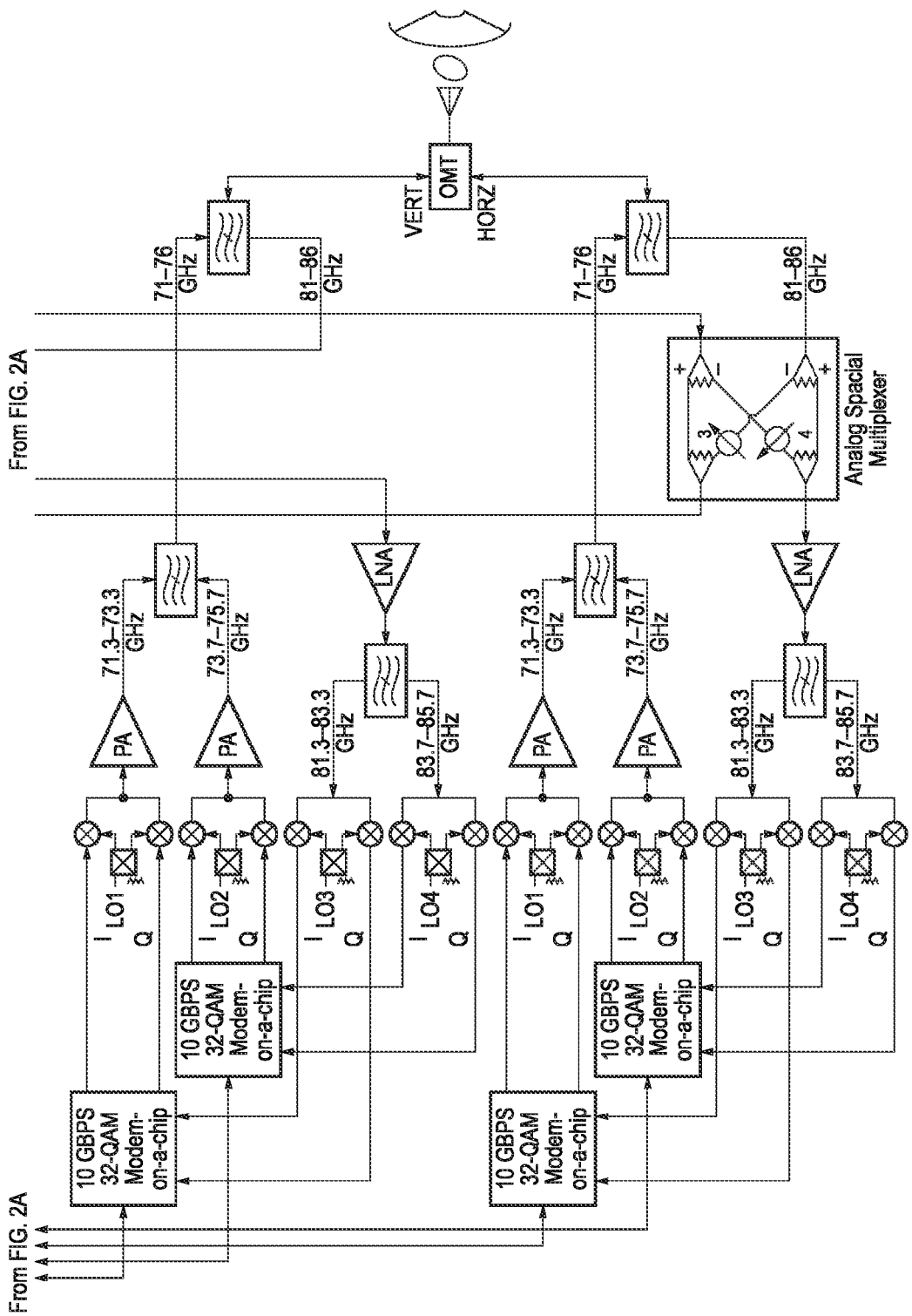
FIG. 2C is an enlarged view of a portion of the system of FIG. 1, according to an embodiment of the present invention.
Figure 2D:
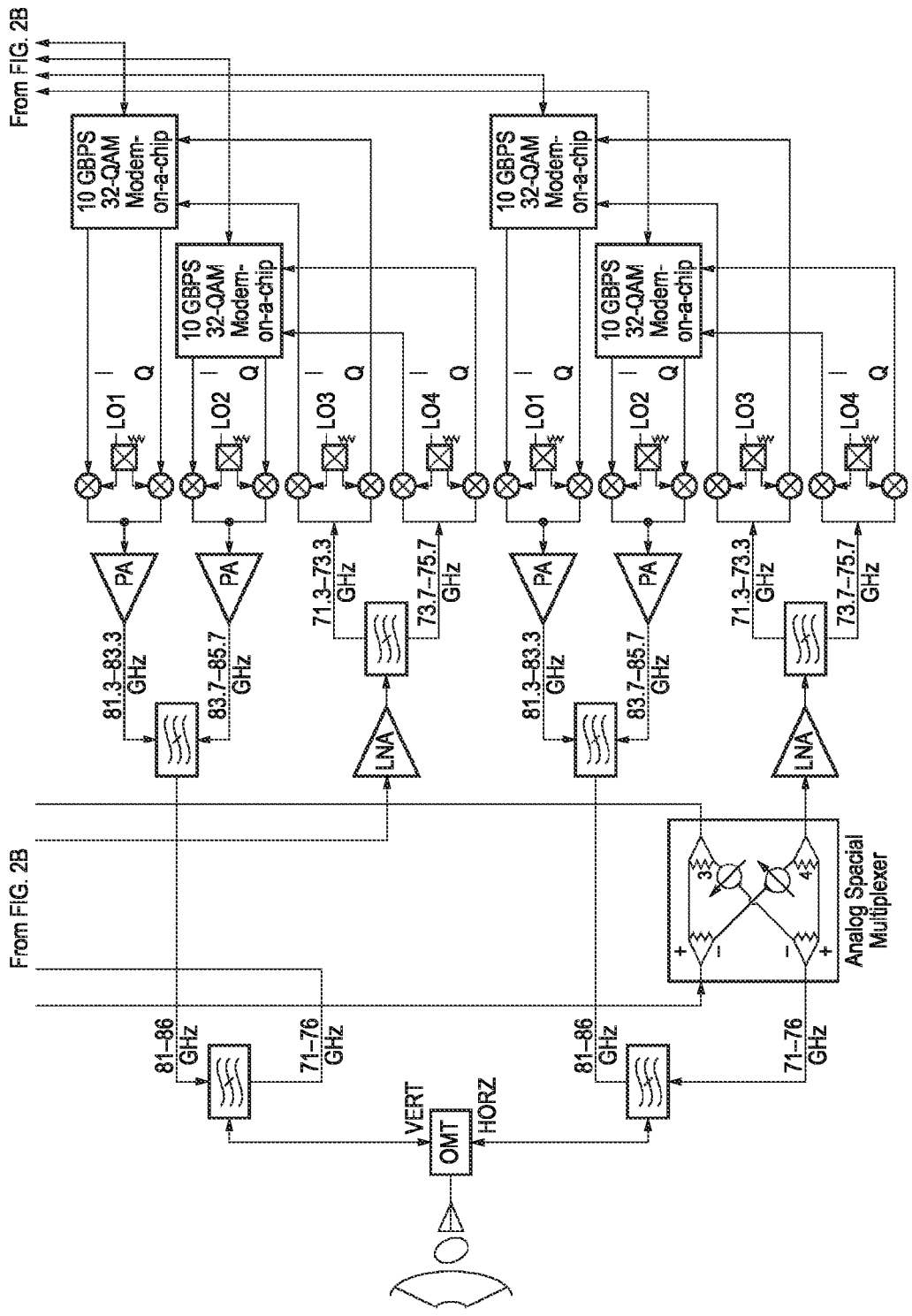
FIG. 2D is an enlarged view of a portion of the system of FIG. 1, according to an embodiment of the present invention.

The detailed description set forth below in connection with the appended drawings is intended as a description of exemplary embodiments of a point-to-point communications link utilizing frequency multiplexing, polarization multiplexing and spatial multiplexing provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

In the design and operation of (free space) radio frequency (RF) point-to-point communications links, spectrum availability may limit the data rates achievable. E-band (60 GHz to 90 GHz) may for example provide point-to-point spectrum totaling 10 GHz, allocated by the Federal Communications Commission (FCC), in 71-76 GHz and 81-86 GHz sub-bands. Modem technologies that utilize higher-order modulation may improve data rates within these sub-bands. The data rates of available modems may also affect the data rate of a point-to-point link. Higher data rate modems may be based on field-programmable gate array (FPGA) technology, resulting in higher joules/bit and higher cost/bit. Modem technology using application specific integrated circuit (ASIC) technology may provide lower joules/bit and cost/bit than its FPGA counterpart. ASIC-based modem-on-a-chip technology, however, may provide lower data rates than FPGA modems, e.g., because state-of-the art modem implementations may be tested using FPGAs before an ASIC is designed.

In one embodiment, a single link may be configured to carry data at 8 times the data rate of a single modem, using a combination of frequency multiplexing, polarization multiplexing, and spatial multiplexing, each providing a factor of 2 increase in data rate. As used herein, the terms "radio frequency" and "RF" include all frequencies suitable for use in directional point-to-point links, e.g., frequencies between 1 MHz and 1,000 GHz.

Referring to FIG. 1, in one embodiment, the link may connect two terminals, one at each end of the link. The two terminals may be separated by a distance referred to as the length of the link. Each terminal may have two antennas; the first terminal may have a first antenna 110 and a second antenna 115, and the second terminal may have a first antenna 120 and a second antenna 125. Each antenna may include a feed horn, a linear-to-circular polarization polarizer, and a reflector. The four antennas in the two terminals may be substantially identical, and may have similar angular beam widths. The antennas in either terminal may be separated by a distance that is small compared to the angular beam width times the length of the link.

Referring to FIGS. 2A-D, in one embodiment four frequency bands are used, two frequency bands (centered on 72.3 GHz and 74.7 GHz, respectively) for transmissions from the first terminal to the second terminal and two frequency bands (centered on 82.3 GHz and 84.7 GHz, respectively) for transmissions from the second terminal to the first terminal. The use of two different bands in each path doubles the data capacity of the channel, and the use of different frequencies in the two directions provides frequency isolation between the transmitted and received signals at each terminal.

Moreover, two polarizations are used in each path, at each frequency, providing a further doubling of the data capacity. In one embodiment, two circular polarizations (i.e., right-handed circular polarization (CP) and left-handed circular polarization) are used. These polarizations may be formed from linearly polarized (e.g., vertical or horizontally polarized) waves traveling out of each antenna feed horn by a respective linear-to-CP polarizer. The same linear-to-CP polarizer may convert received circularly polarized waves to linearly polarized waves. Different linear polarizations on the waveguide side of the feed horn may be separated (for received waves) or combined (for transmitted waves) by an orthomode transducer (OMT).

Referring to FIG. 2A, the feed circuit for one of the four antennas includes a polarization multiplexer section 220, a transmit/receive diplexer section 225, a spatial multiplexer section 230, a frequency multiplexer section 235, and a modulator demodulator section 240. In the polarization multiplexer section 220, received vertically polarized and horizontally polarized waves from the feed horn are separated and directed by an orthomode transducer (OMT) to two different respective branches of the feed circuit. Vertically polarized and horizontally polarized waves from two different respective branches of the feed circuit, propagating in the transmitting direction, are combined into a feed signal for the feed horn. In the transmit/receive diplexer section 225 each of two diplexers directs received waves from the OMT, in the receive frequency band (e.g., 81-86 GHz for the first terminal) into a receive path, and directs waves to be transmitted in the transmit frequency band (e.g., 71-76 GHz for the first terminal) from a transmit path to the OMT.

In the spatial multiplexer section 230, an analog spatial multiplexer 232 forms combinations of the signal from the two antennas 110, 115 in the first terminal, in a manner such that one combination cancels or nulls the signal from the first antenna 120 of the second terminal, and the other combination nulls the signal from the second antenna 125 of the second terminal. The nulling may be achieved using, in each combination, a delayed signal from one of the antennas contributing to the combination, the delay being adjustable to provide the desired null.

In the frequency multiplexer section 235, modulated signals, from respective modems, to be transmitted in two respective sub-bands (e.g., within the 71-76 GHz band, signals in a first 71.3-73.3 GHz sub-band and in a second 73.7-75.7 GHz sub-band) are combined in each of two diplexers, and received signals in two respective sub-bands (e.g., within the 81-86 GHz band, signals in a first 81.3-83.3 GHz sub-band and in a second 83.7-85.7 GHz sub-band) are split in each of two additional diplexers, and sent to respective modems.

In the modulator demodulator section, each of a plurality of integrated circuits (e.g., ASICs) referred to herein as modem chips (e.g., each being a 10 GBPS 64-QAM Modem-on-a-chip as illustrated in FIG. 2A) may receive a digital data stream and convert it to a modulation signal (e.g., a quadrature amplitude modulation (QAM) signal) which is then used to drive an in-phase ("I") mixer and a quadrature ("Q") mixer, to form a modulated RF signal. In the receiving direction, an in-phase ("I") mixer and a quadrature ("Q") mixer receive a received RF signal and demodulate it to form a modulation signal (e.g., a received QAM signal) which is then converted, by the modem chip, into a digital data stream. The local oscillator (LO) inputs of the mixers may be driven by respective in-phase and quadrature local oscillator signals generated by a respective oscillator (e.g., LO1, LO2, etc., in FIG. 2A) and a 90 degree hybrid. Each combination of a modem chip with a transmitting I/Q mixer pair and a receiving I/Q mixer pair is an RF modulator demodulator.

Figure 3:
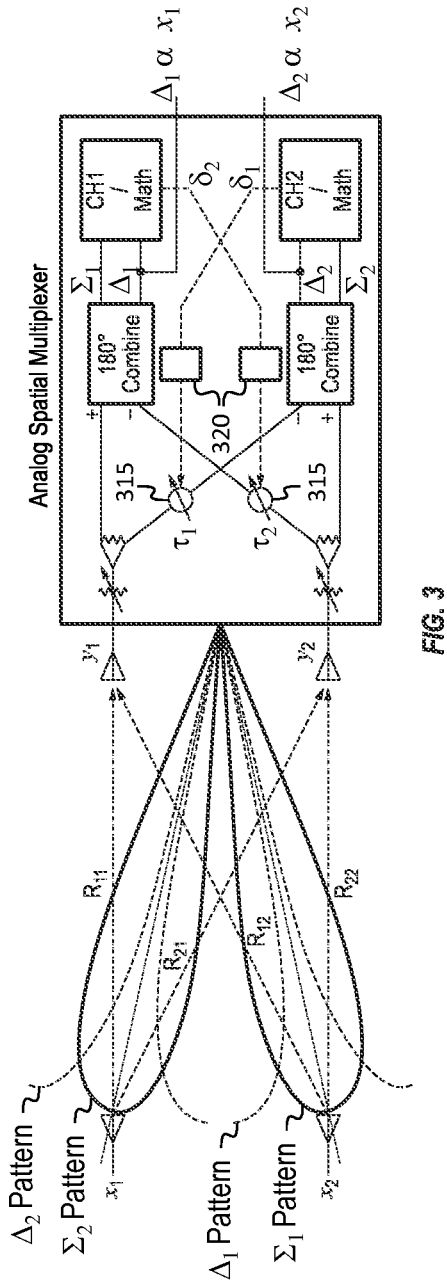
FIG. 3 is a block diagram of an analog spatial multiplexer, according to an embodiment of the present invention.

Referring to FIG. 3, as mentioned above, each analog spatial multiplexer 232 forms combinations of the signal from two antennas, in a manner such that one combination nulls the signal from the first antenna of the other terminal, and the other combination nulls the signal from the second antenna of the other terminal. The nulling may be achieved using a variable delay circuit 315. Each of the variable delay circuits 315 may be adjusted to provide a signal delay that will result in the receiving antenna pattern having a null in the direction of one of the transmitting antennas in the other terminal. The delay circuit characteristics may change with time or with temperature, or other characteristics of the link may change, so that the direction of the null may change with time. In one embodiment periodic manual adjustments are made to the variable delay circuits 315 to restore the direction of the null. In some situations, e.g., if one of the links is on a moving platform, such as an aircraft, manual adjustment of the delay may not result in acceptable performance, and the variable delay circuits 315 may instead be adjusted in real time by a feedback circuit that controls the variable delays, using an analog delta/sum processor or "math block" to continually derive optimal time delay settings. Such a control system may have a loop bandwidth of order 1 kHz or more, i.e., the effective time interval over which the delay is adjusted may be of order 1 ms or less.

Referring to FIG. 3, in one embodiment two waveforms, $x_1$ and $x_2$, are transmitted through a 2×2 multiple input multiple output (MIMO) channel. Two corresponding waveforms, $y_1$ and $y_2$, are received as shown. The $y_1$ and $y_2$ waveforms are each a mixture of the $x_1$ and $x_2$ waveforms. The analog spatial multiplexer 232 includes an in-phase 3 dB splitter that splits each receive signal, sending a portion to each of the two 180 degree combiners, one of the portions being time delayed, by a respective variable delay circuit 315. Each combiner then produces a "difference" signal ($\Delta_1$ or $\Delta_2$), that contains only one of the two transmitted waveforms $x_1$ and $x_2$, the contributions of the other waveform, at the output of the combiner, canceling each other. For example, in the $\Delta_1$ signal at the corresponding output of the channel 1 combiner, the contribution of the $x_2$ signal received through the second antenna cancels the contribution of the $x_2$ signal received through the first antenna.

The analog spatial multiplexer recovers the original $x_1$ and $x_2$ waveforms, by generating four receive antenna patterns $\Sigma_1$, $\Delta_1$, $\Sigma_2$ and $\Delta_2$. The $\Sigma_1$ and $\Sigma_2$ pattern peaks may be aligned with $\Delta_1$, and $\Delta_2$ pattern nulls, respectively, as illustrated in FIG. 3, e.g., if the separation d between the receiving antennas is d=sqrt((n+1/2)λ R), where n is a positive integer, λ is the wavelength of the received waves, and R is the length of the link. The $\Sigma_1$, $\Delta_1$, $\Sigma_2$ and $\Delta_2$ patterns are electronically steered by changing the $\tau_2$ and $\tau_1$ time delays, respectively, within the analog spatial multiplexer. The analog spatial multiplexer points the $\Sigma_1$ and $\Delta_1$ receive antenna patterns at the $x_2$ transmit antenna and points the $\Sigma_2$ and $\Delta_2$ receive antenna patterns at the $x_1$ transmit antenna, as shown. When this condition is met, the $\Delta_1$ and $\Delta_2$ outputs are functions only of $x_1$ and $x_2$, respectively. The antenna beams are aligned to these conditions when the time delays in the analog spatial multiplexer are adjusted to $\tau_1=(R_{21}-R_{11})/c$ and $\tau_2=(R_{12}-R_{22})/c$, where c is the speed of light. The analog spatial multiplexer determines the time delay error using an analog $\Delta/\Sigma$ circuit. The mathematical basis behind the analog spatial multiplexer is explained in further detail below.

In one embodiment, the analog spatial multiplexer is implemented at IF with electronically adjustable time delays capable of +/−60 ps. This may be sufficient to remove fast receiver platform vibrations and slight differential channel effects due to atmospheric scintillation. In a flight application, airframe flexure, and attitude (pitch, roll, and yaw) variances may require several nanoseconds of adjustment for these time delays.

Figure 4:
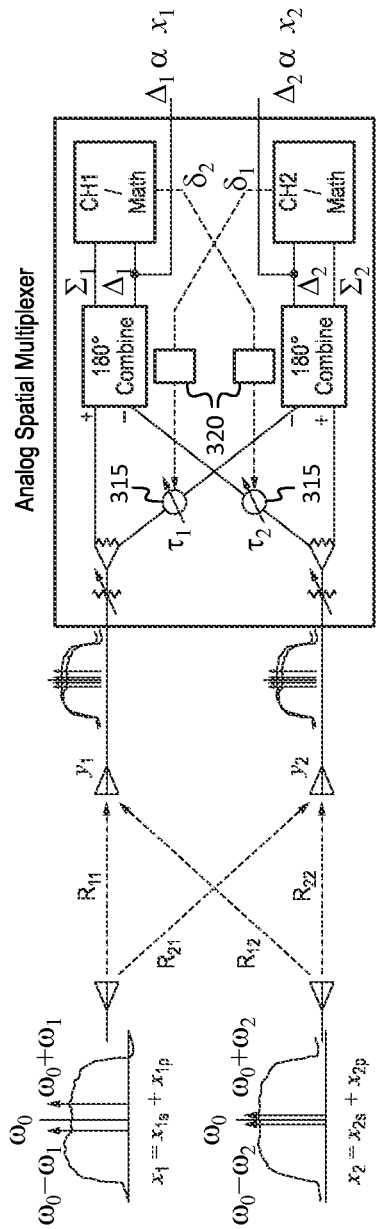
FIG. 4 is a block diagram of an analog spatial multiplexer, according to an embodiment of the present invention.

FIG. 4 illustrates the function of the analog spatial multiplexer used in conjunction with 2×2 MIMO. In one embodiment, two data signals (e.g., signals formed by modulation, by a modulator demodulator, of an RF carrier), $x_{1s}$ and $x_{2s}$, are centered at a frequency $\omega_0$. Tracking tones $x_{1p}$ and $x_{2p}$ consisting of a $\omega_0$ tone amplitude modulated at $\omega_1$ and $\omega_2$, respectively, are injected in the data signals. As a result, the channel 1 and 2 total signals are $x_1=x_{1s}+x_{1p}$ and $x_2=x_{2s}+x_{2p}$, respectively.

The $x_1$ and $x_2$ signals are transmitted over the 2×2 MIMO channel as shown and received as $y_1$ and $y_2$ (up and down conversion to and from RF is implied). The relationship between $y_1$, $y_2$ and $x_1$, $x_2$ is $$\begin{bmatrix} y_1 \\ y_2 \end{bmatrix} = A \begin{bmatrix} e^{-jK_O R_{11}} & e^{-jK_O R_{12}} \\ e^{-jK_O R_{21}} & e^{-jK_O R_{22}} \end{bmatrix} \begin{bmatrix} x_1 \\ x_2 \end{bmatrix} \quad (1)$$

where $R_{11}$, $R_{12}$, $R_{21}$, and $R_{22}$ are the distances between transmit and receive antennas as shown and $K_O$ is the wave number $2\pi/\lambda$. "A" is a constant that includes common $1/R^2$ and atmospheric channel losses. The analog spatial multiplexer creates $\Sigma$ and $\Delta$ functions defined by $$\begin{bmatrix} \Sigma_1 \\ \Sigma_2 \end{bmatrix} = \frac{1}{2} \begin{bmatrix} 1 & e^{-j\omega\tau_2} \\ e^{-j\omega\tau_1} & 1 \end{bmatrix} \begin{bmatrix} y_1 \\ y_2 \end{bmatrix}, \text{ and} \quad (2)$$

$$\begin{bmatrix} \Delta_1 \\ \Delta_2 \end{bmatrix} = \frac{1}{2} \begin{bmatrix} 1 & -e^{-j\omega\tau_2} \\ -e^{-j\omega\tau_1} & 1 \end{bmatrix} \begin{bmatrix} y_1 \\ y_2 \end{bmatrix}. \quad (3)$$

Combining Equations (1) and (3), the relationship between $\Delta_1$, $\Delta_2$ and $x_1$, $x_2$ is found to be $$\begin{bmatrix} \Delta_1 \\ \Delta_2 \end{bmatrix} = \quad (4)$$

$$\frac{A}{2} \begin{bmatrix} e^{-jK_O R_{11}} - e^{-j(K_O R_{21}+\omega\tau_2)} & e^{-jK_O R_{12}} - e^{-j(K_O R_{22}+\omega\tau_2)} \\ e^{-jK_O R_{21}} - e^{-j(K_O R_{11}+\omega\tau_1)} & e^{-jK_O R_{22}} - e^{-j(K_O R_{12}+\omega\tau_1)} \end{bmatrix} \begin{bmatrix} x_1 \\ x_2 \end{bmatrix}$$

$\Delta_1$ can be made to be a function of only $x_1$ and $\Delta_2$ can be made to be a function of only $x_2$ by making the non-diagonal terms of (4) equal to zero. This happens when the time delays are $\tau_1=(R_{21}-R_{11})/c$ and $\tau_2=(R_{12}-R_{22})/c$ where c is the speed of light. If instead the time delays $\tau_1$ and $\tau_2$ have small time errors $\delta_1$ and $\delta_2$, then $$\tau_1=(R_{21}-R_{11})/c+\delta_1, \text{ and} \quad (5)$$

$$\tau_2=(R_{12}-R_{22})/c+\delta_2. \quad (6)$$

Inserting (5) and (6) into (4) yields $$\begin{bmatrix} \Delta_1 \\ \Delta_2 \end{bmatrix} \cong \frac{A}{2} \begin{bmatrix} (1-G)e^{-jK_O R_{11}} & j\omega\delta_2 e^{-jK_O R_{12}} \\ j\omega\delta_1 e^{-jK_O R_{21}} & (1-G)e^{-jK_O R_{22}} \end{bmatrix} \begin{bmatrix} x_1 \\ x_2 \end{bmatrix}, \quad (7)$$

where $G=e^{-jK_0(R_{21}-R_{11}+R_{12}-R_{22})}$. The quantity $|1-G|$ is the MIMO processing gain and is equal to 2 at the Rayleigh range. For the time delays assumed in (5) and (6), it can similarly be shown that $$\begin{bmatrix} \Sigma_1 \\ \Sigma_2 \end{bmatrix} \cong \frac{A}{2} \begin{bmatrix} (1+G)e^{-jK_O R_{11}} & 2e^{-jK_O R_{12}} \\ 2e^{-jK_O R_{21}} & (1+G)e^{-jK_O R_{22}} \end{bmatrix} \begin{bmatrix} x_1 \\ x_2 \end{bmatrix}. \quad (8)$$

Figure 5:
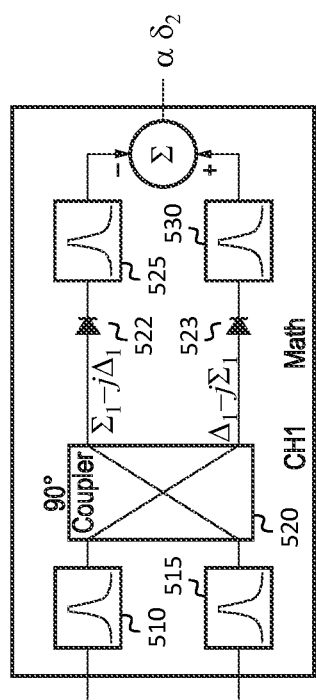
FIG. 5 is a block diagram of an analog spatial multiplexer, according to an embodiment of the present invention.

In one embodiment the channel 1 math block or "$\Delta/\Sigma$ math circuit" of FIG. 5 enables the analog spatial multiplexer to continually drive the time delay error $\delta_2$, to zero, and a similar math block may be used in channel 2 to drive the time delay error $\delta_1$ to zero. The math blocks operate only on the tracking signals. As such, the $\Sigma$ (or "sum") and $\Delta$ (or "difference") signals are band-pass filtered at $\omega_0$ by first and second band-pass filters 510, 515 as shown, passing only $x_{1p}$ and $x_{2p}$ components. These signals are then run through a 90° coupler 520 to yield $\Sigma-j\Delta$ and $\Delta-j\Sigma$ as shown in FIG. 5.

For the channel 1 $\Delta/\Sigma$ math circuit, it can be shown from (7) and (8) that $$\Sigma_1 - j\Delta_1 = \frac{A}{2}(x_{1p}(1+G)e^{-jK_O R_{11}} + x_{2p}2e^{-jK_O R_{12}}) - \quad (9)$$
$$j\frac{A}{2}(x_{1p}(1-G)e^{-jK_O R_{11}} + x_{2p}j\omega_{IF}\delta_2 e^{-jK_O R_{12}}), \text{ and}$$

$$\Delta_1 - j\Sigma_1 = \frac{A}{2}(x_{1p}(1-G)e^{-jK_O R_{11}} + x_{2p}j\omega_{IF}\delta_2 e^{-jK_O R_{12}}) - \quad (10)$$
$$j\frac{A}{2}(x_{1p}(1+G)e^{-jK_O R_{11}} + x_{2p}2e^{-jK_O R_{12}})$$

These signals are then envelope detected by two respective detectors 522, 523. The envelope of (9) and (10) is the original $\omega_1$ and $\omega_2$ tracking signal modulation for channels 1 and 2, respectively. Therefore, passing the envelope of (9) and (10) through a band-pass filter centered at $\omega_2$ results in $$|\Sigma_1 - j\Delta_1| = \left|\frac{A}{2}(2+\omega_{IF}\delta_2)\right|, \text{ and} \quad (11)$$

$$|\Delta_1 - j\Sigma_1| = \left|\frac{A}{2}(\omega_{IF}\delta_2 - 2)\right|. \quad (12)$$

Performing a final subtraction yields the output of the channel 1 $\Delta/\Sigma$ math circuit, Channel 1 $\Delta/\Sigma$ Math Output=$|\Delta_1-j\Sigma_1|-|\Sigma_1-j\Delta_1|=A\omega_{IF}\delta_2 \propto \delta_2$, (13A)

a value proportional to the $\tau_2$ time delay error. As such, the channel 1 math block only processes the tracking tone emitted by the channel 2 transmitter. Likewise, the output of the channel 2 $\Delta/\Sigma$ math circuit can be shown to be Channel 2 $\Delta/\Sigma$ Math Output=$|\Delta_2-j\Sigma_2|-|\Sigma_2-j\Delta_2|=A\omega_{IF}\delta_1 \propto \delta_1$, (14A)

a value proportional to the $\tau_1$ time delay error.

A feedback circuit 320, which may contain an amplifier and a loop-shaping filter such as an integrator, may then be used to control the $\tau_2$ time delay, to continuously hold the channel 1 receive null pattern on the channel 2 transmit antenna. Similarly the output of the channel 2 math block may be used to control the $\tau_1$ time delay, to continuously hold the channel 2 receive null pattern on the channel 1 transmit antenna; in this manner the unintended channel signals are driven to zero.

The variable time delay circuits 315 may be implemented using an electronic time delay chip. A commercial off-the-shelf (COTS) chip that may be used as a time delay chip is the HMC910LC4B manufactured by Analog Devices of Norwood, Mass. (formerly manufactured by Hittite Microwave). This chip operates from DC to 24 GHz and has a minimum continuously-variable time delay range of 60 ps (depending on the frequency of operation). The control voltage of the time delay has a modulation bandwidth of 10 MHz. The chip also has built in temperature compensation as well as a sufficiently low random jitter to ensure sufficient stability for tracking applications. The HMC910LC4B chip may have relative time delay flatness of better than 0.02 ps in a 2 GHz band, where only a flatness of better than 0.1 ps may be needed to achieve acceptable levels of spatial isolation.

Although the HMC910LC4B chip only has 60 ps of delay range, this may be sufficient for tracking a fixed MIMO channel near the Rayleigh range. The diagram in FIG. 3 only shows two variable delay circuits 315; in one embodiment a variable delay circuit 315 is used in each of the four signal paths. This maintains the circuit symmetry and balance such that any hardware related frequency responses are duplicated on each path, which may improve the degree of cancellation at the 180 degree combiner. In addition, the total time delay adjustment is doubled, e.g., to +/−60 ps. In one embodiment, the level of spatial suppression supplied by the analog spatial multiplexer is at least 27 dB, which may provide an adequate signal to interference ratio to operate QAM-64. A tracking tone power 15 dB below the total power of the data signal may be used. Demodulation of this composite signal using an ASIC modem may result in acceptably low (e.g., 0.2 dB) degradation in error vector magnitude (EVM).

Although limited embodiments of a point-to-point communications link utilizing frequency multiplexing, polarization multiplexing and spatial multiplexing have been specifically described and illustrated herein, many modifications and variations will be apparent to those skilled in the art. Accordingly, it is to be understood that a point-to-point communications link utilizing frequency multiplexing, polarization multiplexing and spatial multiplexing employed according to principles of this invention may be embodied other than as specifically described herein. The invention is also defined in the following claims, and equivalents thereof.

What is claimed is:

1. A communications system, comprising:
a first terminal comprising:
a first antenna configured to transmit a first tracking tone;
a second antenna; and
a second terminal comprising:
a third antenna;
a fourth antenna; and
a feed circuit connected to the third antenna and the fourth antenna,
the feed circuit comprising:
a first variable delay circuit;
a first combiner having a first difference output;
a first math block; and
a feedback circuit,
the first combiner being operatively coupled to the third antenna and to the fourth antenna, the first combiner being configured to form, at the first difference output, a first linear combination of a signal from the third antenna and a signal from the fourth antenna, the signal from the fourth antenna being delayed by the first variable delay circuit,
the first math block being configured to output, at a first control output, a signal proportional to a first delay error, the first delay error being the difference between:
a present setting of the first variable delay circuit, and
a nulling setting of the first variable delay circuit, for which, in the first linear combination, a first tracking tone contribution is canceled by a second tracking tone contribution, the first and second tracking tone contributions corresponding to the first tracking tone received by the third and fourth antennas respectively,
the feedback circuit being configured to provide real time feedback from the first control output to the first variable delay circuit.

2. The system of claim 1, wherein the first tracking tone comprises a tone at a carrier frequency, amplitude modulated at a first modulation frequency.

3. The system of claim 2, wherein:
the first combiner further has a first sum output, and
the first combiner is configured to form, at the first sum output, a second linear combination of the signal from the third antenna and the signal from the fourth antenna, the signal from the fourth antenna being delayed by the first variable delay circuit.

4. The system of claim 3, wherein the first math block comprises:
a first band-pass filter connected to the first sum output;
a second band-pass filter connected to the first difference output;
a 90-degree coupler connected to the first band-pass filter and the second band-pass filter,
a first detector and a second detector connected to two respective outputs of the 90-degree coupler;
a third band-pass filter connected to the first detector;
a fourth band-pass filter connected to the second detector; and
a summing circuit connected to respective outputs of the third band-pass filter and the fourth band-pass filter, a summing output of the summing circuit being connected to the first control output.

5. The system of claim 1, wherein:
the feed circuit further comprises a second variable delay circuit, and
the signal from the third antenna is delayed by the second variable delay circuit.

6. The system of claim 1, wherein:
the second antenna is configured to transmit a second tracking tone;
the feed circuit further comprises a second variable delay circuit and a second combiner having a second difference output operatively coupled to the third antenna and to the fourth antenna, the second combiner being configured to form, at the second difference output, a third linear combination of a signal from the third antenna and a signal from the fourth antenna, the signal from the third antenna being delayed by the second variable delay circuit; and
the feed circuit comprises a second math block configured to output, at a second control output, a signal proportional to a second delay error, the second delay error being the difference between:
a present setting of the second variable delay circuit and
a nulling setting of the second variable delay circuit, for which, in the third linear combination, a third tracking tone contribution is canceled by a fourth tracking tone contribution, the third and fourth tracking tone contributions corresponding to the second tracking tone received by the third and fourth antennas respectively,
the second control output being operatively coupled to the second variable delay circuit.

7. The system of claim 6, wherein:
the first tracking tone comprises a tone at a carrier frequency, amplitude modulated at a first modulation frequency; and the second tracking tone comprises a tone at the carrier frequency, amplitude modulated at a second modulation frequency.

8. The system of claim 1, wherein the feed circuit further comprises a diplexer, having a first frequency-selective port, a second frequency-selective port, and a common port, the diplexer being connected between the third antenna and the first combiner, the diplexer being configured to transmit signals in a first frequency range to the first combiner.

9. The system of claim 8, wherein the first frequency range has a lower bound at about 71 GHz and an upper bound at about 76 GHz.

10. The system of claim 1, wherein the feed circuit further comprises an orthomode transducer connected between the third antenna and the first combiner, the orthomode transducer being configured to transmit signals having a first linear polarization from the third antenna to the first combiner.

11. The system of claim 10, wherein the third antenna comprises a linear-to-circular polarization polarizer.

12. The system of claim 1, wherein the first difference output is connected to a diplexer having a first frequency-selective port, a second frequency-selective port, and a common port, the first difference output being connected to the common port.

13. The system of claim 12, wherein the first frequency-selective port of the diplexer is connected to an input of a modulator demodulator.

14. The system of claim 13, wherein the modulator demodulator comprises a mixer connected to the input of the modulator demodulator and a modem chip.

15. The system of claim 14, wherein the modem chip is an application specific integrated circuit.

16. The system of claim 15, wherein the modem chip is configured to demodulate quadrature amplitude modulation.

17. A communications system, comprising:
a first terminal including:
a first antenna;
a second antenna; and
a feed circuit connected to the first antenna and to the second antenna,
the feed circuit having two outputs and comprising a variable delay circuit, and a feedback circuit, the feed circuit being configured:
to form, at a first output of the two outputs, a signal corresponding to a superposition of
a signal received by the feed circuit from the first antenna and
a signal received by the feed circuit from the second antenna, delayed by the variable delay circuit, and
the feedback circuit being configured to provide real time feedback to the first variable delay circuit to adjust a delay of the variable delay circuit so as to cancel, at the first output, a signal corresponding to an electromagnetic wave received from a first direction.

18. The communications system of claim 17, further comprising:
a second terminal,
the first terminal being configured to receive, from the second terminal, electromagnetic waves including:
a first component, modulated with a first data stream, and having:
a first polarization state,
a first carrier frequency, and
a first direction, and
a second component, modulated with a second data stream, and having:
a second polarization state, different from the first polarization state,
a second carrier frequency, different from the first carrier frequency, and
a second direction, different from the first direction.

19. A communications system, comprising:
a first antenna configured to transmit a first tracking tone;
a second antenna;
a third antenna;
a fourth antenna; and
a feed circuit connected to the third antenna and the fourth antenna,
the feed circuit comprising a first variable delay circuit, a first combiner having a first difference output, and a first math block,
the first combiner being operatively coupled to the third antenna and to the fourth antenna, the first combiner being configured to form, at the first difference output, a first linear combination of a signal from the third antenna and a signal from the fourth antenna, the signal from the fourth antenna being delayed by the first variable delay circuit,
the first math block being configured to output, at a first control output, a signal proportional to a first delay error, the first delay error being the difference between:
a present setting of the first variable delay circuit. and
a nulling setting of the first variable delay circuit, for which, in the first linear combination, a first tracking tone contribution is canceled by a second tracking tone contribution, the first and second tracking tone contributions corresponding to the first tracking tone received by the third and fourth antennas respectively,
the first control output being operatively coupled to the first variable delay circuit,
wherein the feed circuit further comprises a diplexer, having a first frequency-selective port, a second frequency-selective port, and a common port, the diplexer being connected between the third antenna and the first combiner, the diplexer being configured to transmit signals in a first frequency range to the first combiner,
wherein the first frequency range has a lower bound at about 71 GHz and an upper bound at about 76 GHz.

* * * * *